United States Patent [19]

Kuboshima et al.

[11] Patent Number: 5,868,397
[45] Date of Patent: *Feb. 9, 1999

[54] RETAINING STRUCTURE OF O-RING

[75] Inventors: Hidehiko Kuboshima; Shinichi Tsuchiya, both of Haibara-gun, Japan

[73] Assignee: Yazaki Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 801,296

[22] Filed: Feb. 18, 1997

Related U.S. Application Data

[63] Continuation of Ser. No. 528,524, Sep. 15, 1995, abandoned.

[30] Foreign Application Priority Data

Sep. 20, 1994 [JP] Japan .................................... 6-224584

[51] Int. Cl.$^6$ ...................................................... F16J 15/00
[52] U.S. Cl. ............................................ 277/637; 277/642
[58] Field of Search ................................... 277/189, 637, 277/642, 630, 639, 641

[56] References Cited

U.S. PATENT DOCUMENTS 4,749,429  6/1988  Condon et al. .......................... 277/189
4,825,015  4/1989  Prett et al. ............................... 277/189
5,301,958  4/1994  Covington ............................... 277/189

FOREIGN PATENT DOCUMENTS 4-115782  10/1992  Japan .

*Primary Examiner*—Daniel G. DePumpo
*Attorney, Agent, or Firm*—Armstrong, Westerman, Hattori, McLeland & Naughton

[57] ABSTRACT

A retaining structure for a flexible O-ring which is used for sealing a gap between an electrical device and an electrical connector to be mounted directly on an electrical device, comprises a pressing projection provided on an inner peripheral wall of an O-ring-receiving groove for a connector housing, and a notch portion provided for an outer peripheral wall of the O-ring-receiving groove on the opposite side of the pressing projection, wherein an O-ring inserted into the O-ring-receiving groove is held by engagements by contacting portions defined by a pointed end of the pressing projection and oppositely disposed contacting portions $P_1$ and $P_2$ on an outer peripheral wall.

5 Claims, 5 Drawing Sheets

RETAINING STRUCTURE OF O-RING

This application is a continuation of application Ser. No. 08/528,524 filed Sep. 15, 1995, now abandoned.

BACKGROUND OF THE INVENTION

1. Field of the Invention

This invention relates to a retaining structure of an O-ring which is used for sealing a gap between an electrical device and an electrical connector to be mounted directly on the electrical device.

2. Description of the Prior Art

Hitherto, in an electrical connector which is mounted directly on an electrical device, in order to maintain the device airtight or watertight, a gap between an electrical connector and the device is sealed by causing an O-ring to intervene. As in FIG. 8, which shows in a schematic sectional view is shown of airtight-type coaxial connector K, as disclosed in Japanese Utility Model Application Laid Open No. HEI 4-115782.

In this airtight-type coaxial connector K, an O-ring d is inserted into an O-ring-receiving groove c for maintaining a sealing property at a device mounting surface b of a connector housing a.

However, in such O-ring-receiving groove c, the O-ring d tends to slip off from the O-ring-receiving groove, while assembling work for the connector housing a is conducted. For the above reason, the operator must perform assembling work while giving attention that the O-ring d is retained in the groove consequently, there arises the problem that assembling efficiency of the device deteriorates.

SUMMARY OF THE INVENTION

In view of the foregoing, it is an object of the present invention to provide a retaining structure for an O-ring in which a structure of an O-ring-receiving groove on a device is improved so that an O-ring is temporarily connected to the inside of the O-ring-receiving groove for the connector housing, thus to prevent the O-ring from slipping off from the O-ring-receiving groove accordingly, while mounting work of the connector is performed, with the result that the connector assembling work can be performed accurately and easily.

According to one aspect of the present invention, for achieving the above-described object there is provided a retaining structure for an O-ring in which a connector housing is mounted on an electrical device through an O-ring to seal the gap between the connector housing and an electrical device, the retaining structure comprising a pressing projection provided for an inner peripheral wall of an O-ring-receiving groove of the connector housing, and a notch portion provided for an outer peripheral wall of the O-ring-receiving groove opposite the pressing projection, wherein the retaining structure of the O-ring causes the O-ring inserted into the O-ring-receiving groove to be held between the pressing projection and the outer peripheral wall.

According to another aspect of the present invention, there is provided an O-ring retaining structure in which, when the minimum width of the O-ring-receiving groove is W, the minimum depth of the O-ring-receiving groove is F, the minimum diameter of the O-ring is D, and the maximum crosssectional area of the O-ring is R, a gap $T_1$ between a pointed end of the pressing projection and a bottom of the notch portion, and a projection length $T_2$ from the inner peripheral wall to the pointed end of the pressing projection are established so as to satisfy the following conditions;

$T_1 > R/F$ $T_2 > W - D$.

It is preferable that the connector directly mounted on the device is a shielded connector having a metallic shell.

As described above, there is an O-ring retaining structure according to the present invention in which both the pressing projection and the notch portion are provided for the O-ring-receiving groove of the connector housing so that the O-ring can be held between the pressing projection and the outer peripheral wall of the O-ring-receiving groove by virtue of the elasticity of the O-ring itself.

Namely, the O-ring inserted into the O-ring-receiving groove bends outwardly to a diameter greater than diameter of the inner peripheral wall of the O-ring-receiving groove because the O-ring is pressed by the pointed end of the pressing projection. At this time, since the notch portion is provided in the outer peripheral wall opposite the pressing projection, the bent portion of the O-ring is received into the notch. There are two contacting portions, $P_1$ and $P_2$, in which an outer peripheral surface of the O-ring comes into contact with the outer peripheral wall of the O-ring receiving-groove, whereby a pressing force is effected. Accordingly, the O-ring is temporarily connected positively at three locations in such a way that the O-ring is held by the pointed end of the pressing projection and the two contacting portions, $P_1$ and $P_2$ of the outer peripheral wall. In the handling manipulation when the connector housing is mounted on the casing, the O-ring is not easily removable from the O-ring-receiving groove. Accordingly, the assembling efficiency of the device is remarkably improved.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will now be described in detail referring to the accompanying drawings.

Figure 1:
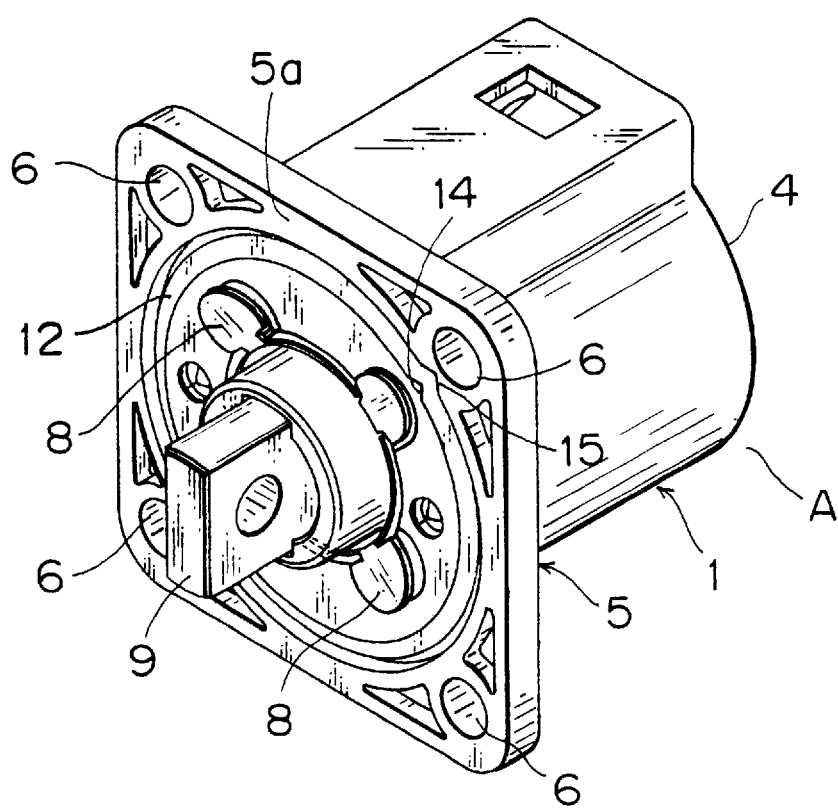
FIG. 1 is a sectional view showing a connector directly mounted on the device according to one embodiment of the present invention.

FIG. 1 is a sectional view showing a connector A directly mounted on a device according to one embodiment of the present invention.

Figure 2:
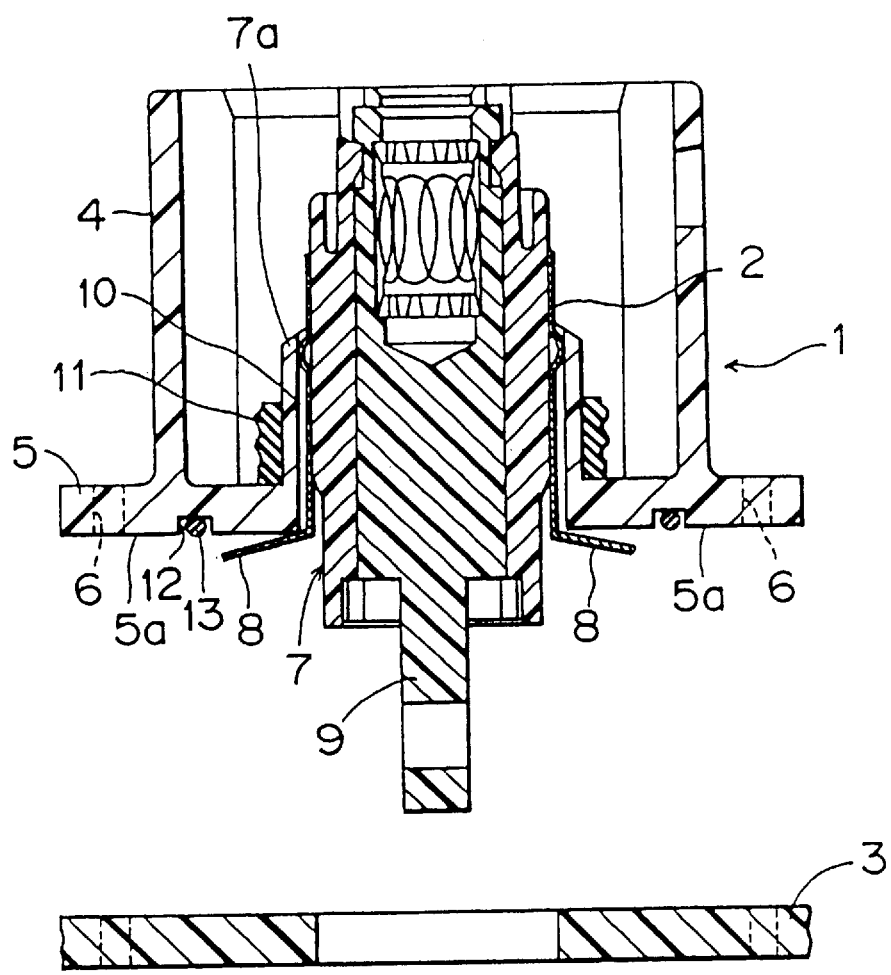
FIG. 2 is a vertical sectional view showing a connector directly mounted on the device of FIG. 1.

FIG. 2 is a vertical sectional view showing the connector A directly mounted on the device of FIG. 1.

In the connector A, which is directly mounted on the device, a metallic shell 2, for use in shielding is interiorly mounted on the connector housing 1, enabling the connector housing 1 to be mounted directly to the conductive casing 3 of an electrical device of the motor, and so on.

Figure 3:
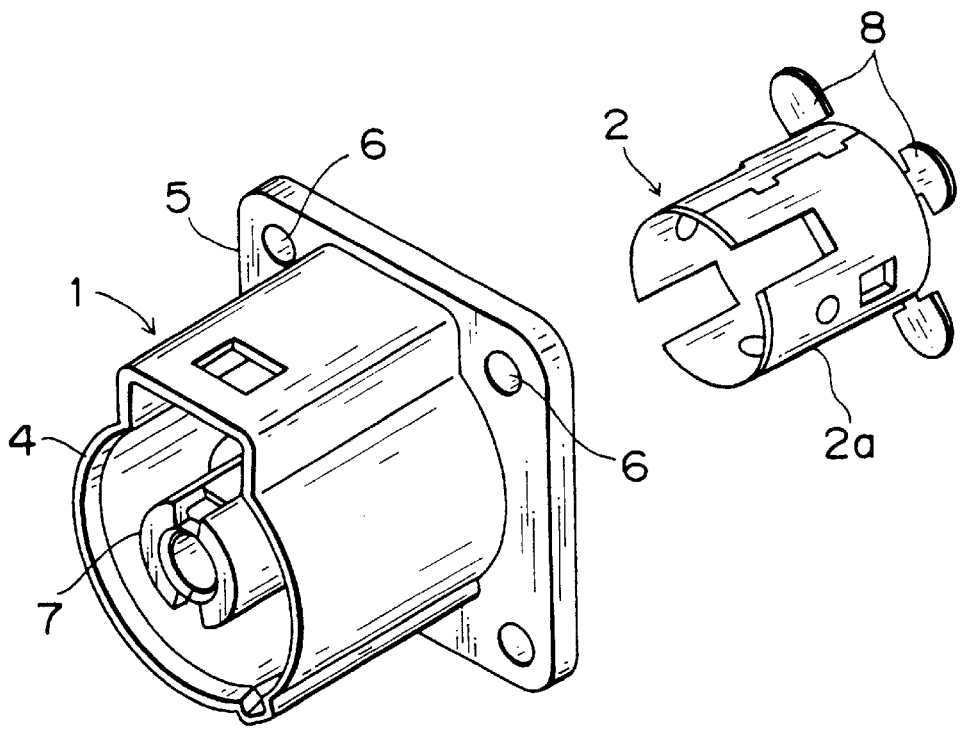
FIG. 3 is a sectional view showing a connector housing and a metallic shell of FIG. 1.

In the connector housing 1, a flange 5 to be mounted on the casing 3 is formed around on one end of a cover portion 4 receiving an outer cylindrical portion of the other connector. A mounting hole 6 is bored in four corners of the flange 5. On the inside of the cover portion 4, a cylindrically shaped terminal metallic parts accommodating member 7 is provided so as to penetrate the substantially central part of the flange 5. As shown in FIG. 3, the metallic shell 2 is fitted on the periphery of the terminal metallic parts-accommodating member 7. The metallic shell 2 is fitted on the terminal metallic parts-accommodating member 7, by a cylindrical body portion 2a of the shell being inserted into a shell receiving groove 10 which is provided for the peripheral wall 7a of the terminal metallic parts-accommodating member 7.

Terminal metallic parts 9 are accommodated on the inside of the terminal metallic parts accommodating member 7, both ends of which are opened. A rubber plug 11 is put on the outside of the peripheral wall 7a of the terminal metallic parts-accommodating member 7. The terminal metallic parts 9 and the metallic shell 2 are connected to the terminals and the shielding members of the other connector (not illustrated) respectively.

Figure 4:
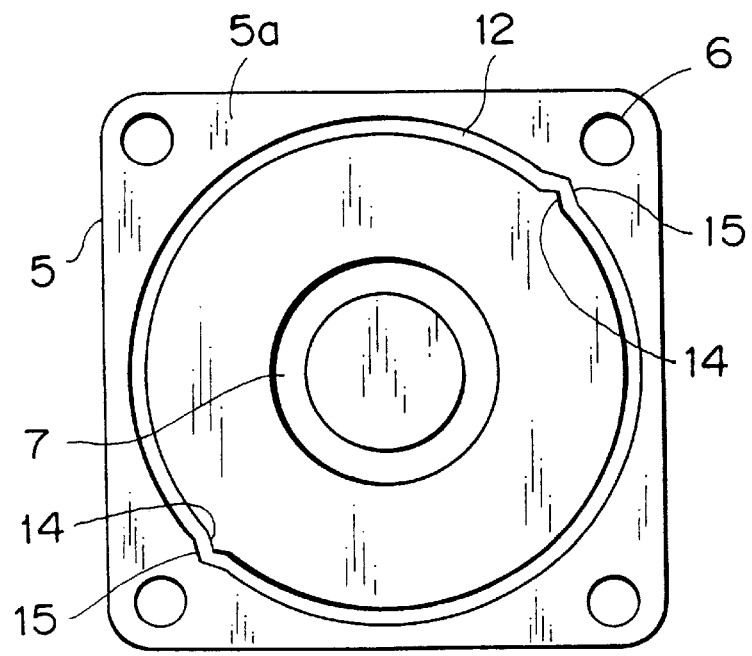
FIG. 4 is a bottom view showing a device mounting surface of the connector housing of FIG. 1.

As shown in FIG. 4, a substantially circularly shaped O-ring-receiving groove 12 is formed around a device-mounting surface 5a of the flange 5. The connector housing 1 and the casing 3 are sealed therebetween, causing the O-ring 13 to be inserted into the O-ring-receiving groove 12 when the connector housing 1 is mounted on the casing 3.

Figure 5:
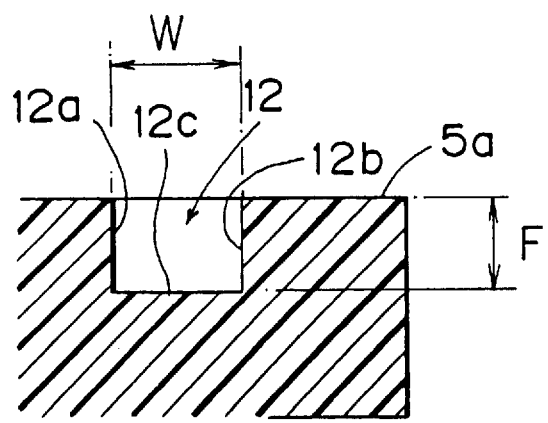
FIG. 5 is a sectional view showing a shape of an O-ring-receiving groove of FIG. 4.
Figure 6:
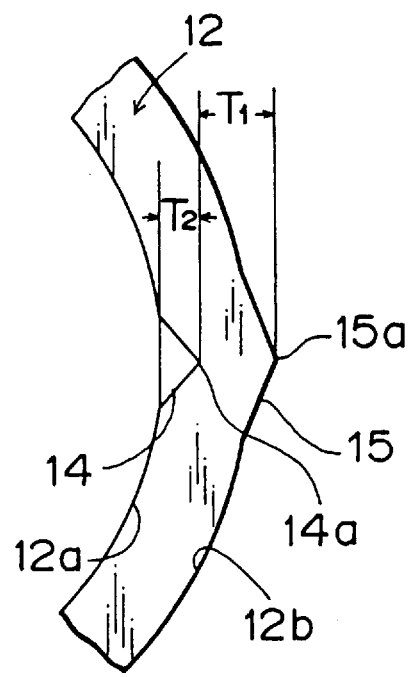
FIG. 6 is an explanatory view showing a pressing projection and a notch portion which are provided for the O-ring-receiving groove of FIG. 4.

As shown in FIG. 5, the O-ring-receiving groove 12 comprises an inner peripheral wall 12a, an outer peripheral wall 12b and a bottom wall 12c so as to be formed as a rectangularly shaped groove in section. As shown in FIGS. 4 and 6, an angularly shaped pressing projection 14, which is offset from the inner peripheral wall 12a of the O-ring-receiving groove 12 toward the outer peripheral wall 12b thereof, is positioned diametrically opposite sides of the flange 5, along with a V-shaped notch portion 15 is formed in the outer peripheral wall 12b opposite the respective pressing projections 14.

As shown in FIG. 6, when the minimum width of the O-ring-receiving groove 12 is W, the minimum depth of the O-ring-receiving groove 12 is F, the minimum diameter of the O-ring 13 is D, and the maximum sectional area of the O-ring 13 is R, a gap $T_1$ between a pointed end 14a of the pressing projection 14 and a bottom 15a of the notch portion 15, and the projection length $T_2$ from the inner peripheral wall 12a to the pointed end 14a of the pressing projection 14 are established so as to satisfy the relationship for the following condition;

$T_1 > R/F$ $T_2 > W-D.$

Namely, in the present embodiment, the width of the O-ring-receiving groove 12 is the length between the inner peripheral wall 12a and the outer peripheral wall 12b: $W_{aaf}$3.25 mm+0.25 mm, $W_{min}$=3.25 mm−0 mm, W=3.25 mm.

The depth of the O-ring-receiving groove 12 is the height from the bottom wall 12c to the device mounting surface 5a, it is 1.8 mm±0.05 mm, ∴F=1.75 mm.

The diameter of the thickness for the O-ring 13 is 2.4 mm±0.07 mm, ∴D=2.33 mm.

The maximum sectional area of the O-ring 13 is R=4.79 mm$^2$.

Consequently, $T_1$ and $T_2$ are established as follows:

$T_1 > 4.79/1.75$ ∴ $T_1 > 2.74$ mm $T_2 > 3.25 - 2.33$ ∴ $T_2 > 0.92$ mm

Figure 7:
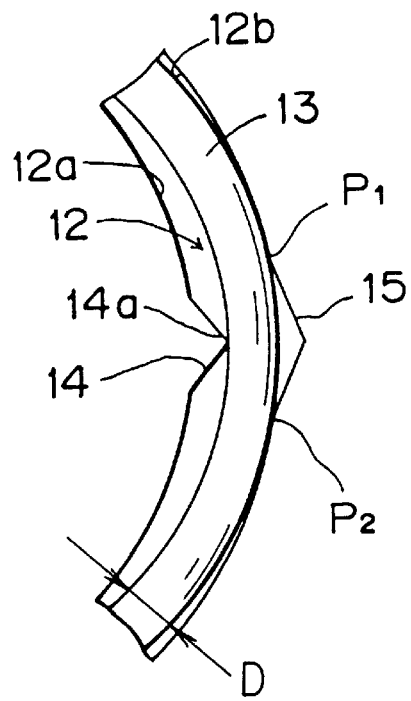
FIG. 7 is an explanatory view showing a holding condition of the O-ring between the pressing projection and the notch portion of the O-ring-receiving groove of FIG. 6.
Figure 8:
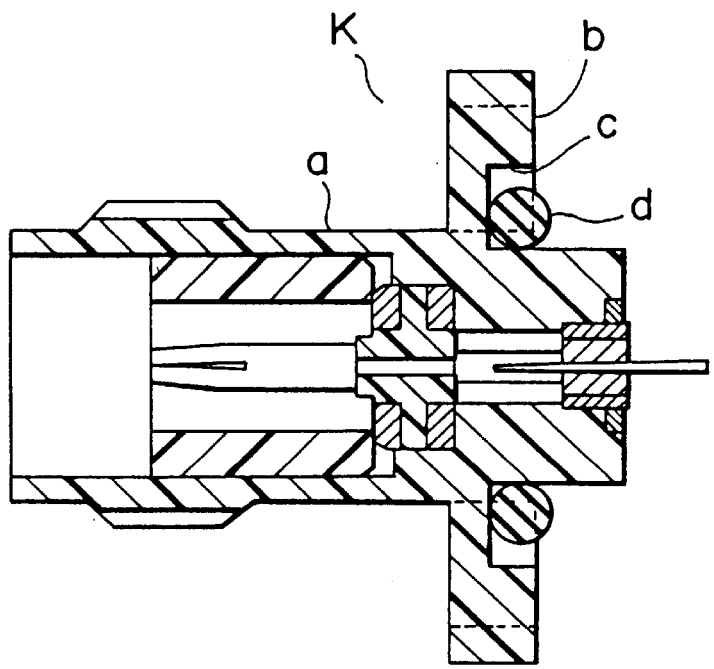
FIG. 8 is an explanatory view showing an O-ring of a conventional connector directly mounted on the device.

As described above, the pressing projection 14 and the notch portion 15 are established so that as shown in FIG. 7, the O-ring 13 is held between the pressing projection 14 and the outer peripheral wall 12b of the O-ring-receiving groove 12 by virtue of the elasticity of the O-ring 13 itself, when the O-ring in inserted into the O-ring-receiving groove 12.

Namely, the O-ring 13 bends outward because the O-ring 13 is pressed by the pointed end 14a of the pressing projection 14. At this time, since the notch portion 15 is provided for the outer peripheral wall 12b opposite the pressing projection 14 and, the bent portion of the O-ring 13 is received in the notch 15, there are two contacting portions, $P_1$ and $P_2$, in which an outer peripheral surface of the O-ring 13 comes into contact with the outer peripheral wall 12b of the O-ring-receiving groove 12, whereby a pressing force is is effected. Accordingly, the O-ring 13 is temporarily connected positively at these locations in such a way that the O-ring 13 is held by the pointed end 14a of the pressing projection 14 and the two contacting portions, $P_1$ and $P_2$, of the outer peripheral wall 12b. In the handling manipulation wherein the connector housing 1 is mounted on the casing 3, the O-ring 13 is not easily removable from the O-ring-receiving groove 12.

In the above described embodiment, the pressing projection 14 and the notch portion 15 are provided for the O-ring-receiving groove 12 at two locations, however, the locations and the number of pressing projections and limited. Namely, numbers of three or more locations are permitted and the places where they are to be provided are not restricted particularly. Further, the shape of the O-ring-receiving groove, which is provided for the flange of the connector housing might not be limited as a circular shape. Instead, it is permitted that the O-ring-receiving groove may have another shape, such as an ellipse.

As described above, according to the present invention, since both the pressing projection and the notch portion are provided for the O-ring-receiving groove of the connector housing, the O-ring is temporarily connected in a stable manner so as to be held at three places including the one pointed end of the pressing projection resulting from the notch portion and two contacting projections. Accordingly, the assembling efficiency is remarkably improved because the O-ring does not get out of the O-ring-receiving groove during assembly of the connector.

Further, by rendering the establishment of qualification to both the O-ring-receiving and the O-ring groove, as described in regard to FIG. 6, there are advantages in that the sealing function of the O-ring is not adversely effected because the O-ring can be deformed in the stable manner on a inside of the O-ring-receiving groove, even if the O-ring is compressed so as to effectively mount the connector on the other device.

While preferred embodiments of the invention have been described using specific terms, such description is for illustrative purpose only, and it is to be understood that changes and variations may be made without departing from the spirit or scope of the following claims.

What is claimed is:

1. Apparatus for sealing a gap between a connector housing and an electrical device including, in combination, a generally circular flexible O-ring having a minimum cross-sectional diameter D and a maximum cross-sectional area R and a retaining structure for retaining said O-ring, said retaining structure comprising:

an annular groove having substantially rectangularly arranged bottom and opposed, concentrically spaced, generally circular peripheral side walls formed in a sealing surface of one of said connector housing and said electrical device and having cross-sectional dimensions defining a space operative to receive said O-ring;

a pressing projection having a pointed end extending from one generally circular peripheral side wall of said groove and projecting into said space of said groove to define a first contacting edge extending substantially parallel to the surface of said one peripheral side wall; and a notch portion communicating with said groove space and being defined by wall portions forming a recess provided in a surface of the other generally circular peripheral side wall of said groove opposite to the side wall containing said pressing projection, the intersection of said generally circular side wall portions with walls defining said recess forming second contacting edges extending substantially parallel to the surface of said other peripheral side wall at spaced locations in said other groove peripheral side wall surface, said notch portion being located in oppositely disposed relation with respect to said pressing projection to locate said first contacting edge intermediate said second contacting edges in alternating opposed relation in which, when the minimum width of said groove measured between said opposed peripheral side walls is W, the minimum depth of said groove is F, a gap $T_1$ between said pointed end of said pressing projection and a bottom of said notch portion, and a length of said projection portion $T_2$ measured from said one peripheral side wall to said pointed end of said pressing projection are established to satisfy the relationships:

$T_1 > R/FG,$ and $T_2 > W-D$ whereby said O-ring, when inserted in said groove, will be engaged at alternating, longitudinally spaced locations by said first and second contacting edges, respectively.

2. Apparatus according to claim 1 in which said connector housing is a shielded housing for direct mounting on an electrical device, together with a metallic shell.

3. Apparatus according to claim 1 in which said one peripheral side wall of said retaining structure is a radially inner peripheral side wall of said groove and said opposed peripheral side wall of said groove is a radially outer peripheral side wall thereof.

4. Apparatus according to claim 1 in which said pressing projection extends into said groove space a distance sufficient to deflect said O-ring into said recess and into contact with said second contact edges.

5. Apparatus according to claim 1 in which said groove, in the region defined by the cooperation between said pressing projection and said notch portion, defines a volume as great as said O-ring positioned in said groove upon assembly of said connector housing and said electrical device.

* * * * *